(12) United States Patent
Oveyssi

(10) Patent No.: US 7,372,670 B1
(45) Date of Patent: May 13, 2008

(54) DISK DRIVE INCLUDING MAGNETIC ELEMENT SUPPORT WITH PRIMARY AND SECONDARY MAGNETIC FLUX PATHS

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 422 days.

(21) Appl. No.: 11/057,565

(22) Filed: Feb. 14, 2005

(51) Int. Cl.
*G11B 5/48* (2006.01)
(52) U.S. Cl. .................................... 360/264.7
(58) Field of Classification Search ............ 360/264.7, 360/264.8, 264.9
See application file for complete search history.

(56) References Cited

U.S. PATENT DOCUMENTS

| | | | |
|---|---|---|---|
| 5,585,679 A | 12/1996 | Bracken et al. | |
| 5,862,020 A * | 1/1999 | Lee | 360/264.7 |
| 5,905,609 A | 5/1999 | Butler et al. | |
| 6,421,208 B1 | 7/2002 | Oveyssi | |
| 6,462,914 B1 * | 10/2002 | Oveyssi et al. | 360/264.8 |
| 6,462,941 B1 | 10/2002 | Hulick et al. | |
| 6,507,462 B1 | 1/2003 | Gibbs et al. | |
| 6,529,351 B1 * | 3/2003 | Oveyssi et al. | 360/264.8 |
| 6,549,380 B2 * | 4/2003 | Kazmierczak | 360/264.8 |
| 7,161,768 B1 * | 1/2007 | Oveyssi | 360/264.8 |
| 2001/0048576 A1 | 12/2001 | Kazmierczak | |
| 2004/0105190 A1 | 6/2004 | Kim et al. | |
| 2005/0099734 A1 | 5/2005 | Rafaelof | |

FOREIGN PATENT DOCUMENTS

JP  05041044 A  *  2/1993

* cited by examiner

*Primary Examiner*—Tianjie Chen
(74) *Attorney, Agent, or Firm*—Stetina, Brunda, Garred & Brucker

(57) ABSTRACT

A disk drive includes a base, a disk, an actuator with a coil having first and second legs, and a magnetic element support. The support includes a first plate section including a first support portion and a first extension portion. The support includes a second plate section including a second support portion and a second extension portion. The second extension portion is cooperatively formed with the first extension portion to receive the first leg with the second leg between the first and second extension portions. The magnetic element support further includes a transition section between the first and second plate sections. A primary magnetic flux path extends through the first support portion, the transition section, the second support portion, and the first leg. A secondary magnetic flux path extends through the second support portion, the second extension portion, the second leg, the first extension portion, and the first support portion.

12 Claims, 6 Drawing Sheets

DISK DRIVE INCLUDING MAGNETIC ELEMENT SUPPORT WITH PRIMARY AND SECONDARY MAGNETIC FLUX PATHS

CROSS REFERENCE TO RELATED APPLICATIONS

This application is related to U.S. application Ser. No. 11/057,678, entitled DISK DRIVE INCLUDING A MAGNETIC ELEMENT SUPPORT WITH A FIRST TRANSITION SECTION ANGULARLY LATERAL TO A COIL AND A SECOND TRANSITION SECTION RADIALLY BEYOND THE COIL, filed concurrently herewith on Feb. 14, 2005, incorporated herein by reference.

BACKGROUND OF THE INVENTION

1. Field of the Invention

The present invention relates generally to disk drives, and in particular to a disk drive including a magnetic element support with primary and secondary magnetic flux paths.

2. Description of the Prior Art

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one transducer head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit assembly. A conventional "rotary" or "swing-type" actuator assembly typically includes a rotary actuator having an actuator body. The actuator body has a bore and a pivot bearing cartridge engaged within the bore to facilitate rotational movement of the actuator assembly between limited positions about an axis of rotation. A coil support extends from one side of the actuator body. An actuator coil is supported by the coil support and is configured to interact with one or more permanent magnetic elements, typically a pair, to form a voice coil motor. One or more actuator arms extend from an opposite side of the actuator body. Each head gimbal assembly includes a transducer head, typically a magneto-resistive ("MR") head, which is distally attached to each of the actuator arms. Each magnetic disk includes opposing disk surfaces. Data may be recorded along data annular regions on a single disk surface or both. As such, the head stack assembly may be pivoted such that each transducer head is disposed adjacent to the various data annular regions from adjacent to the outer diameter to the inner diameter of each disk.

As mentioned above, typically a pair of magnetic elements is used to form a voice coil motor. Typically each of the magnetic elements is supported by a magnetic element support plate or mount. The plates may have bent ends that contact each other to form a single loop enclosing the magnetic elements. A magnetic flux path extends in a single loop through the magnetic element support plates and between the two magnetic elements. A leg of the coil is positioned between the two magnetic elements. Current passing through the coil results in a torque being applied to the rotary actuator. A change in direction of the current through the coil results in a change in direction of the torque applied to the rotary actuator.

Accordingly, there is a need in the art for an improved magnetic element support configuration in comparison to the prior art.

SUMMARY OF THE INVENTION

An aspect of the present invention can be regarded as a disk drive. The disk drive includes a disk drive base. The disk drive further includes a disk rotatably coupled to the disk drive base. The disk drive further includes a rotary actuator coupled to the disk drive base adjacent the disk. The rotary actuator is configured to pivot about an axis of rotation. The rotary actuator includes a coil, and the coil includes a first leg and a second leg. The disk drive further includes first and second magnetic elements. The disk drive further includes a magnetic element support coupled to the disk drive base. The magnetic element support includes a first plate section including a first support portion and a first extension portion. The first magnetic element is attached to the first support portion. The magnetic element support further includes a second plate section including a second support portion and a second extension portion. The second magnetic element is attached to the second support portion. The second extension portion is cooperatively formed with the first extension portion to receive the first leg between the first and second magnetic elements with the second leg between the first and second extension portions. The magnetic element support further includes a transition section formed between the first and second plate sections. A primary magnetic flux path extends through the second magnetic element, the second support portion, the transition section, the first support portion, the first magnetic element, and the first leg. A secondary magnetic flux path extends through the second magnetic element, the second support portion, the second extension portion, the second leg, the first extension portion, the first support portion, the first magnetic element, and the first leg.

According to various embodiments, the first plate section, the second plate section, and the transition section may be formed of a unitary piece of material. The transition section may be integrally formed with the first and second support portions. The rotary actuator may further include a coil support, and the coil may be supported by the coil support. The first leg may generally radially extend with respect to the axis of rotation and a second leg may generally radially extend with respect to the axis of rotation. The first magnetic element may include two poles and the second magnetic element may include two poles. The first and second magnetic elements may have poles with opposite polarities facing each other. The magnetic element support may be formed of steel. The magnetic element support may be metal plated. The transition section may be curved. The transition section may be C-shaped. The transition section may be disposed radially beyond the first and second magnetic elements with respect to the axis of rotation. The first and second extension portions may be disposed generally angularly lateral to the first and second magnetic elements with respect to the axis of rotation.

DESCRIPTION OF THE PREFERRED EMBODIMENTS

Figure 1:
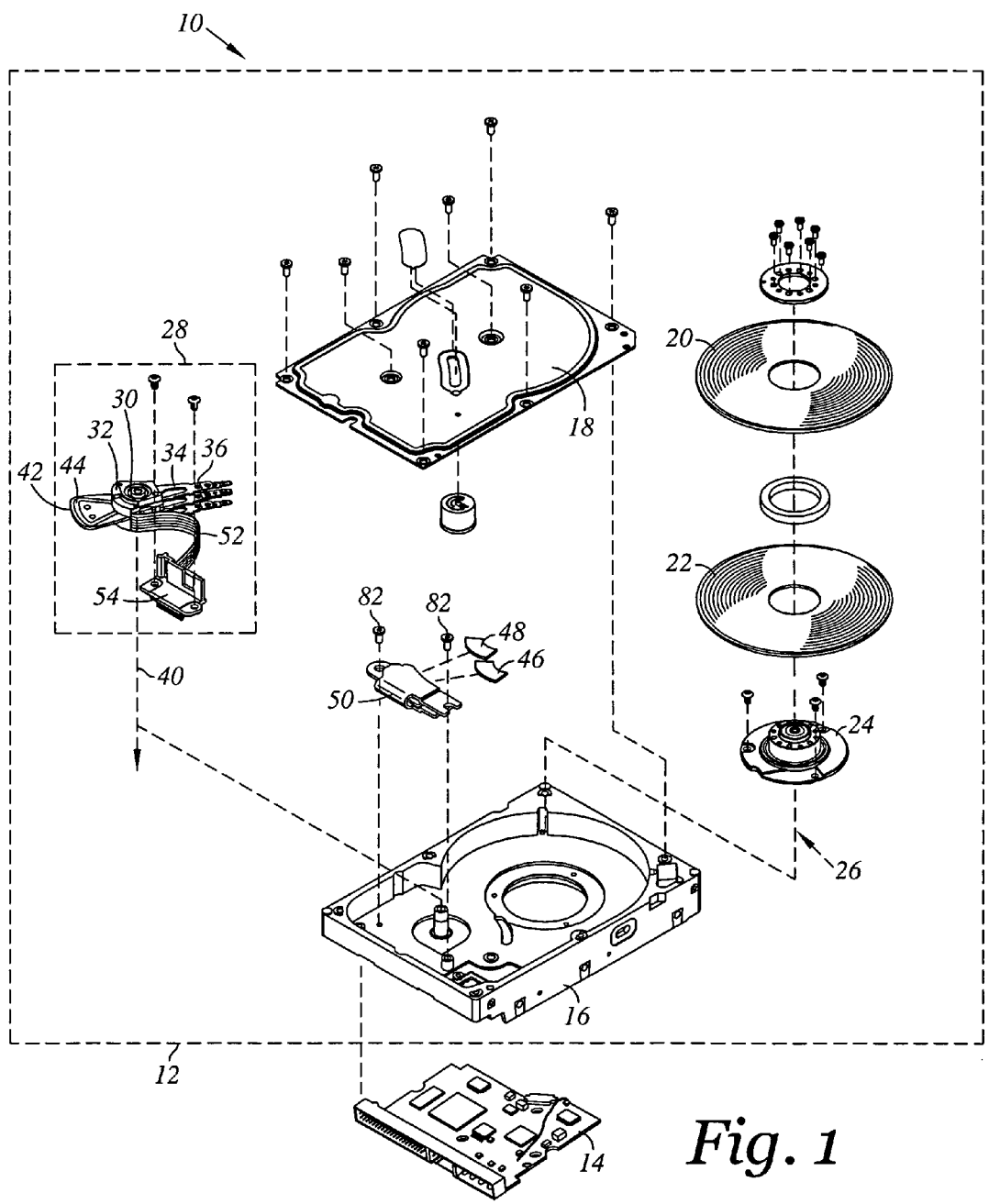
FIG. 1 is an exploded perspective view of a disk drive including a magnetic element support in accordance with an aspect of the present invention.

Referring now to the drawings wherein the showings are for purposes of illustrating preferred embodiments of the present invention only, and not for purposes of limiting the same, FIGS. 1, 2, 2a, 3, 3a, 4, 4a, 5, 5a, 5b, 6, and 7 illustrate a disk drive and a magnetic element support in accordance with the aspects of the present invention.

Figure 2:
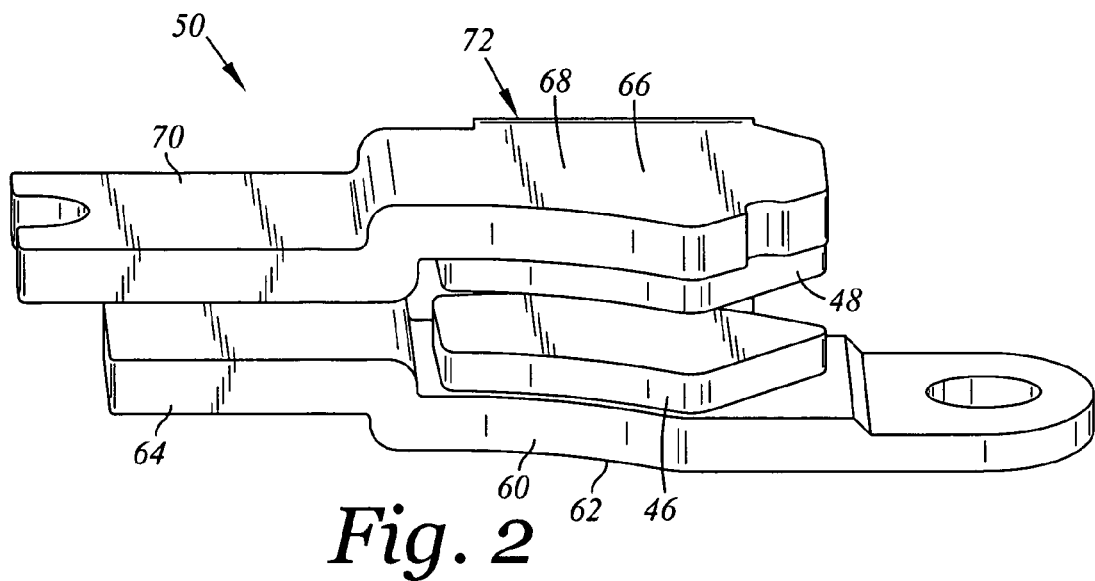
FIG. 2 is an enlarged top perspective view of the magnetic element support of FIG. 1 as shown with first and second magnetic elements.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. FIG. 2 depicts the disk drive 10 as assembled without the cover 18. The disk drive base 16 and the cover 18 collectively house disks 20, 22. Each disk 20, 22 contains a plurality of tracks for storing data. The head disk assembly 12 further includes a spindle motor 24 for rotating the disks 20, 22 about a disk rotation axis 26. The head disk assembly 12 further includes a head stack assembly 28 rotatably attached to the disk drive base 16 in operable communication with the disks 20, 22. The head stack assembly 28 includes a rotary actuator 30.

The rotary actuator 30 includes an actuator body 32 and actuator arms (for ease of illustration, only a topmost one being denoted 34) that extend from the actuator body 32. Distally attached to the actuator arms 34 are suspension assemblies (the topmost one denoted 36). The suspension assemblies 36 respectively support sliders (the topmost one denoted 38). Each of the sliders 38 includes a transducer head. The suspension assemblies 36 with the sliders 38 are referred to as head gimbal assemblies. It is contemplated that the number of actuator arms and suspension assemblies may vary depending upon the number of disks and disk surfaces utilized.

The actuator body 32 includes a bore, and the rotary actuator 30 further includes a pivot bearing cartridge engaged within the bore for facilitating the actuator body 32 to rotate between limited positions about an axis of rotation 40. The actuator 30 further includes a coil support 42 that extends from one side of the actuator body 32 opposite the actuator arms 34. The coil support 42 is configured to support a coil 44.

First and second of magnetic elements 46, 48 are supported by a magnetic element support 50 of the present invention which is attached to the disk drive base 16 with fasteners 80. The coil 44 interacts with the first and second magnetic elements 46, 48 to form a voice coil motor for controllably rotating the actuator 30. The head stack assembly 28 further includes a flex circuit assembly 52 and a cable connector 54. The cable connector 54 is attached to the disk drive base 16 and is disposed in electrical communication with the printed circuit board 14. The flex circuit assembly 52 supplies current to the actuator coil 44 and carries signals between the transducer heads of the sliders 38 and the printed circuit board assembly 14.

An aspect of the present invention can be regarded as a disk drive 10 including the disk drive base 16, a disk (such as disk 20) rotatably coupled to the disk drive base 16, and the rotary actuator 30 coupled to the disk drive base 16 adjacent the disk 20. The rotary actuator 30 is configured to pivot about the axis of rotation 40, and includes the coil 44. As seen in FIGS. 5, 5a, 5b, and 6, the coil 44 includes a first leg 56 and a second leg 58. The disk drive 10 further includes the first and second magnetic elements 46, 48.

The disk drive 10 further includes the magnetic element support 50 coupled to the disk drive base 16. The magnetic element support 50 includes a first plate section 60 including a first support portion 62 and a first extension portion 64. The first magnetic element 46 is attached to the first support portion 62. The magnetic element support 50 further includes a second plate section 66 including a second support portion 68 and a second extension portion 70. The second magnetic element 48 is attached to the second support portion 68. The second extension portion 70 is cooperatively formed with the first extension portion 64 to receive the first leg 56 between the first and second magnetic elements 46, 48 with the second leg 58 between the first and second extension portions 64, 70. The magnetic element support 50 further includes a transition section 72 formed between the first and second plate sections 60, 66.

A primary magnetic flux path extends through the first magnetic element 46, the first support portion 62, the transition section 72, the second support portion 68, the second magnetic element 48, and the first leg 56. A secondary magnetic flux path extends through the first magnetic element 46, the first support portion 62, the first extension portion 64, the second leg 58, the second extension portion 70, the second support portion 68, and the second magnetic element 48.

Figure 2A:
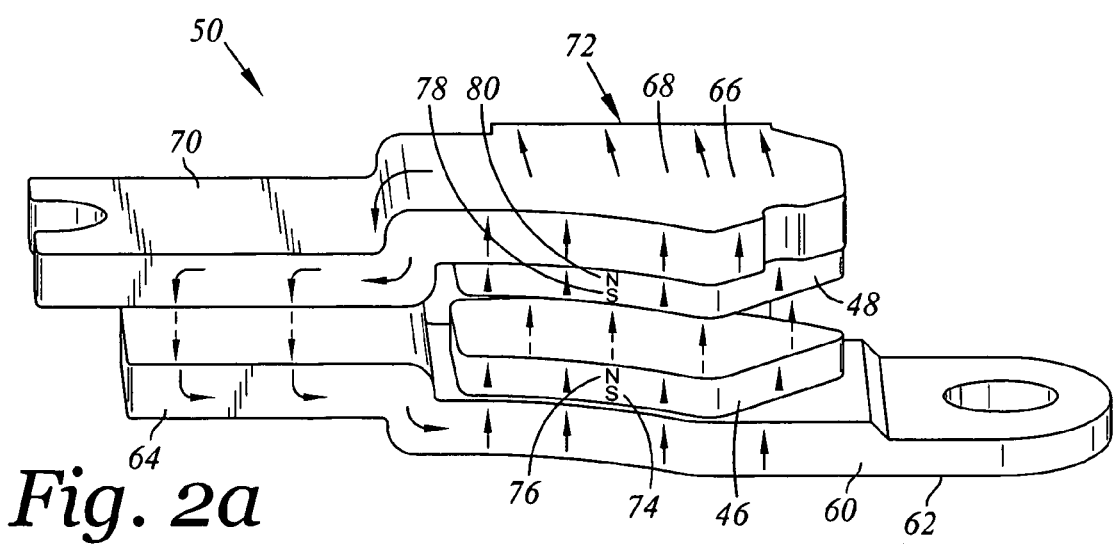
FIG. 2a is the magnetic element support and the magnetic element of FIG. 2 as shown with magnetic flux lines.
Figure 3:
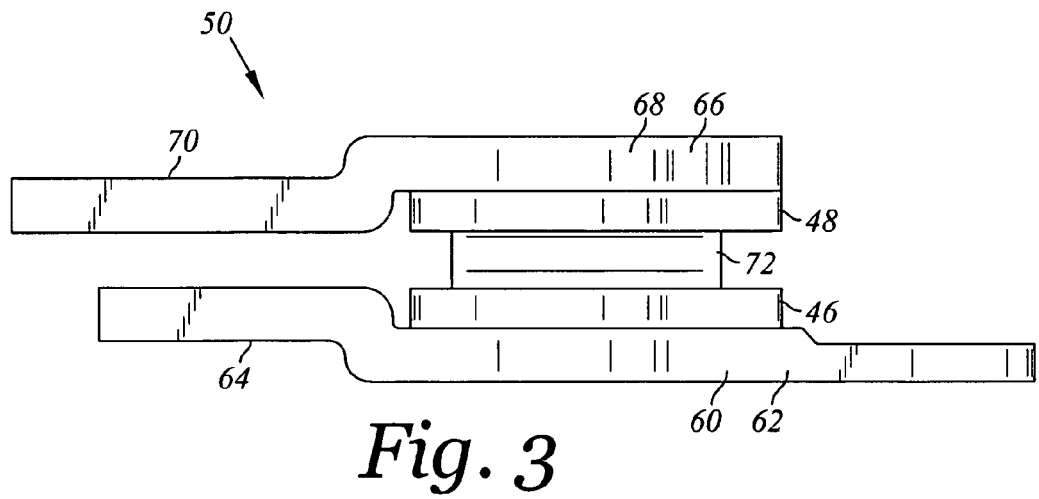
FIG. 3 is a side view of the magnetic element support and the magnetic elements of FIG. 2.
Figure 3A:
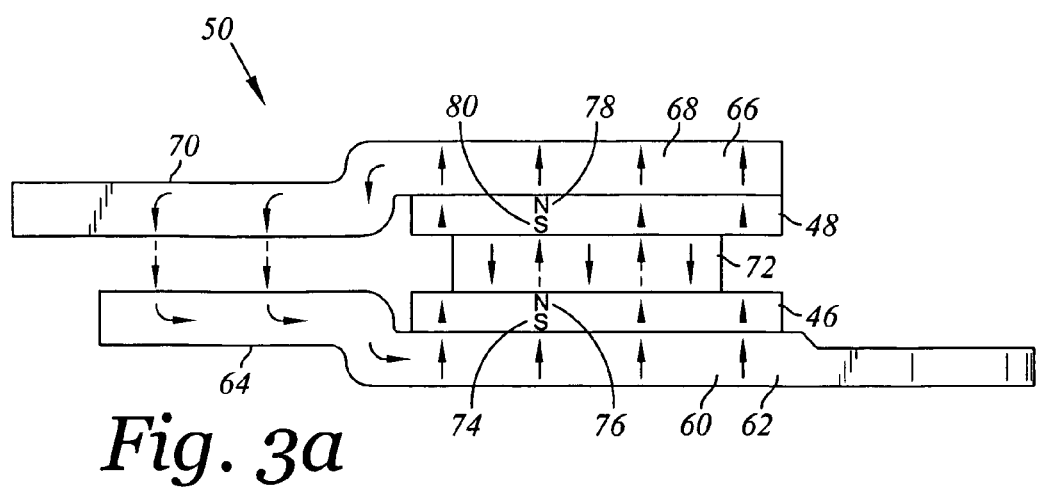
FIG. 3a is the magnetic element support and the magnetic elements of FIG. 3 as shown with magnetic flux lines.
Figure 4:
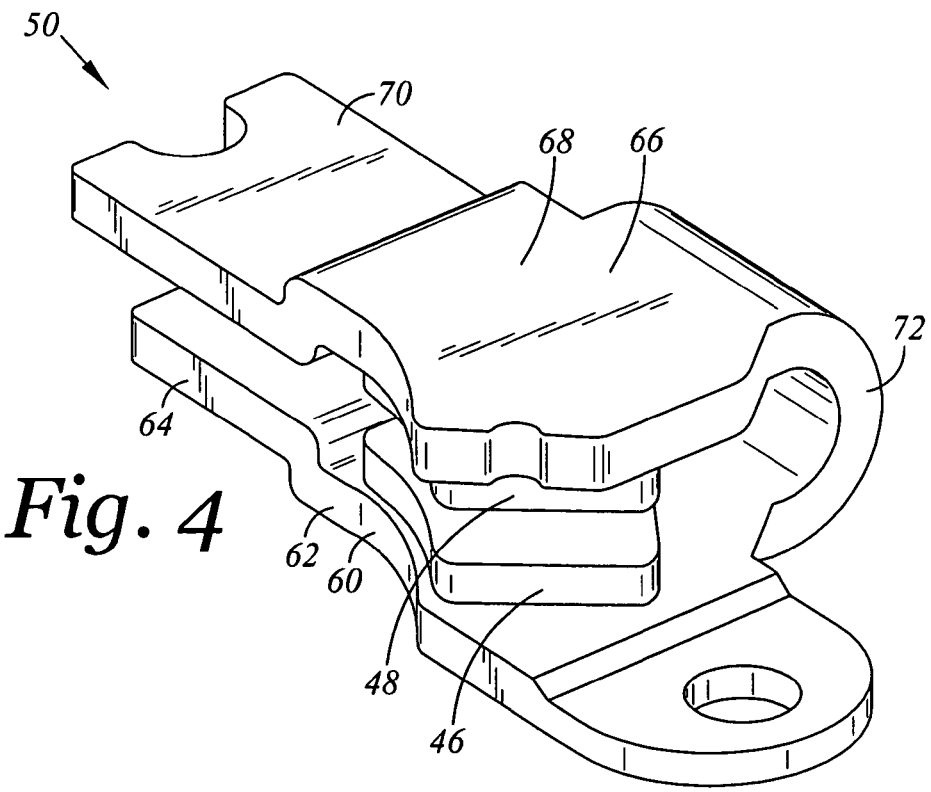
FIG. 4 is perspective view from another viewing angle of the magnetic element support and the magnetic elements of FIG. 2.
Figure 4A:
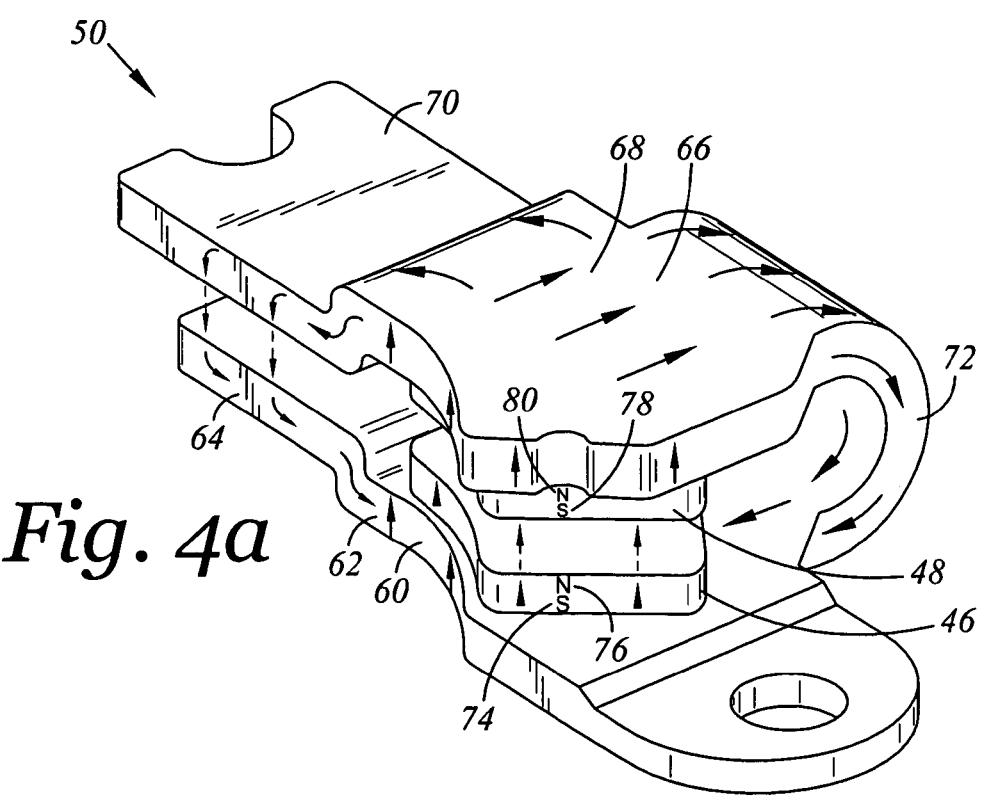
FIG. 4a is the magnetic element support and the magnetic elements of FIG. 4 as shown with magnetic flux lines.

According to various embodiments, as seen in FIGS. 2a, 3a, and 4a, the first magnetic element 46 may include two poles 74, 76, and the second magnetic element 48 may include two poles 78, 80. In the configuration shown, the first and second magnetic elements 46, 48 may have poles 76, 78 with opposite polarities facing each other. In this regard, the pole 76 is indicated as having an N-type polarity and pole 78 is indicated as having an S-type polarity.

Figure 5:
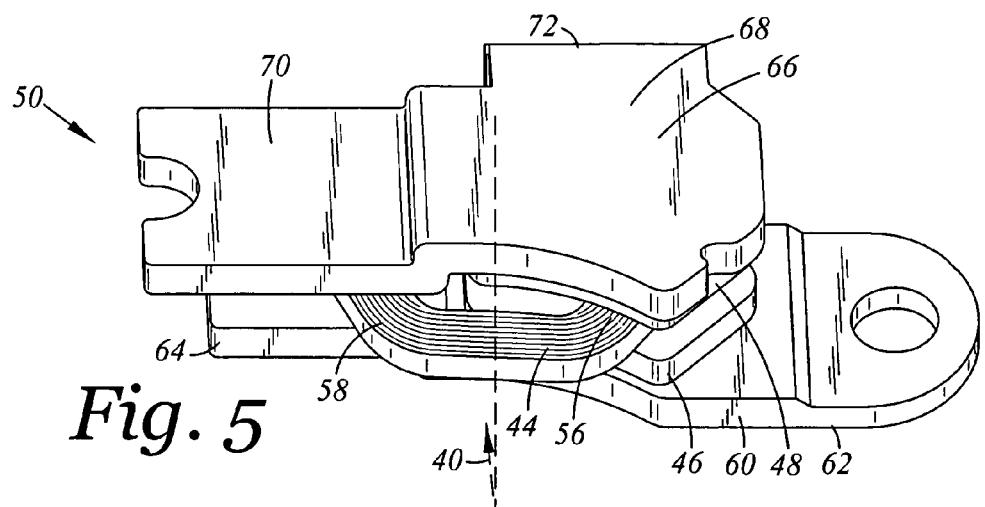
FIG. 5 is an enlarged perspective view of the magnetic element support and the first and second magnetic elements as shown with a coil.
Figure 5A:
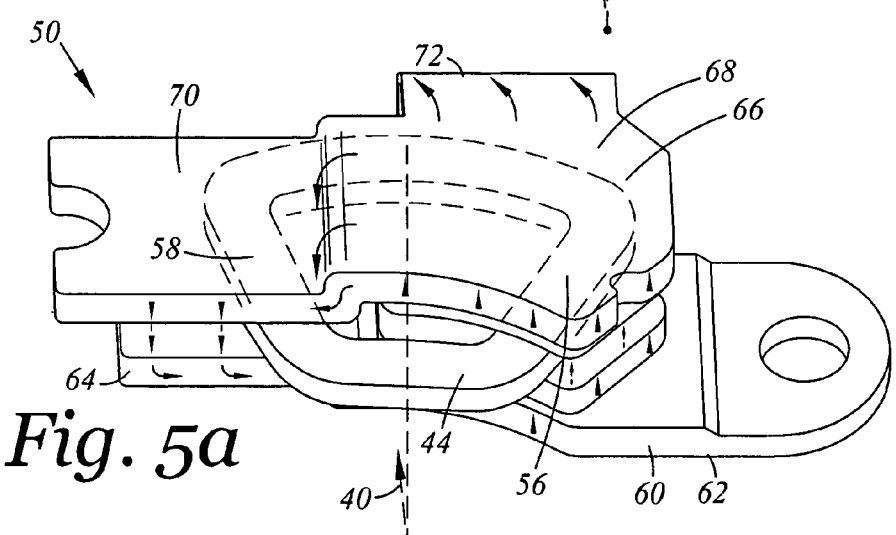
FIG. 5a is the magnetic element support, the first and second magnetic elements, and the coil (a portion of which is shown in phantom lining) as shown with magnetic flux lines.
Figure 5B:
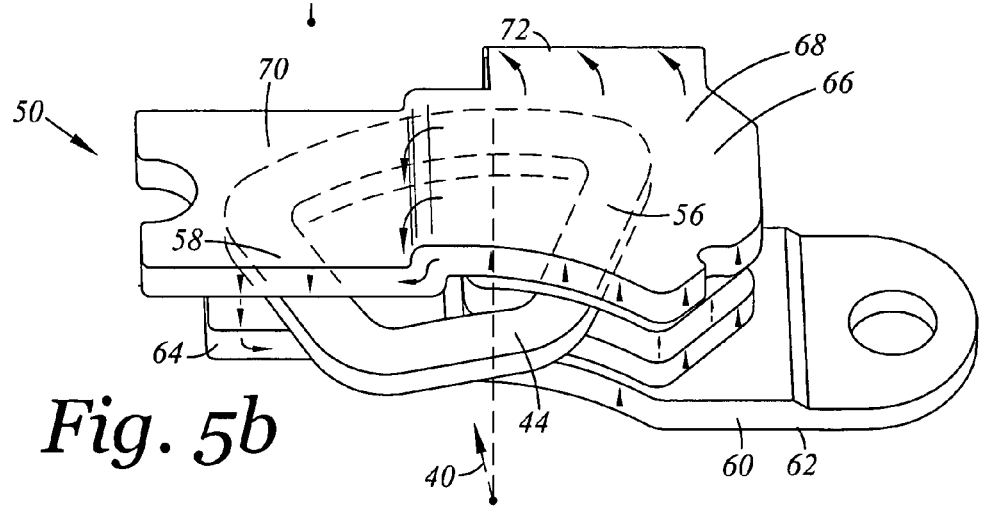
FIG. 5b is the magnetic element support, the first and second magnetic elements, and the coil of FIG. 5a, however, with the coil in another operable position.

Referring now to FIGS. 5, 5a, 5b, and 6, the first leg 56 may generally radially extend with respect to the axis of rotation 40 and a second leg 58 may generally radially extend with respect to the axis of rotation 40. The first leg 56 is positioned between the first and second magnetic elements 46, 48. In this embodiment, the first leg 56 is maintained inside (i.e., between) the first and second magnetic elements 46, 48 throughout the full range of operable motion the rotary actuator 30. The second leg 58 is positioned between the first and second extension portions 64, 70. In this embodiment, the second leg 58 is maintained inside (i.e., between) the first and second extension portions 64, 70 throughout the full range of operable motion the rotary actuator 30. FIGS. 5a and 5b illustrate the relative positioning of the coil 44 with respect to the magnetic element support 50 and the magnetic element 46, 48 in each of its positions associated with extreme operable positions of the rotary actuator 30.

As mentioned above a primary magnetic flux path is formed to extend through the second magnetic element 48, the second support portion 68, the transition section 72, the first support portion 62, the first magnetic element 46, and the first leg 56. As shown in FIGS. 2a, 3a, and 4a magnetic flux lines are indicated (solid lines symbolically indicating the direction of magnetic flux flowing through the magnetic element support 50 and dashed lines symbolically indicating the direction of magnetic flux flowing through the airspace adjacent the magnetic element support 50).

As further mentioned above, the secondary magnetic flux path extends through the second magnetic element 48, the second support portion 68, the second extension portion 70, the second leg 58, the first extension portion 64, the first support portion 62, the first magnetic element 46, and the first leg 56. In this regard, the first leg 56 is exposed to the magnetic flux field of the first and second magnetic elements 46, 48 and is within both the primary and secondary magnetic flux paths. It is contemplated that the secondary magnetic flux path begins to flow once the transition section 72 becomes magnetically saturated.

Advantageously, even though the second leg 58 is not immediately between the first and second magnetic elements 46, 48, the second leg 58 may nonetheless contribute to the production of torque in an angular direction similar to that associated with the first leg 56. This is because the secondary magnetic flux path flows in a downward direction across the second leg 58, which is opposite that of the upward direction of the secondary magnetic flux path across the first leg 56 for the indicated polarities.

Figure 6:
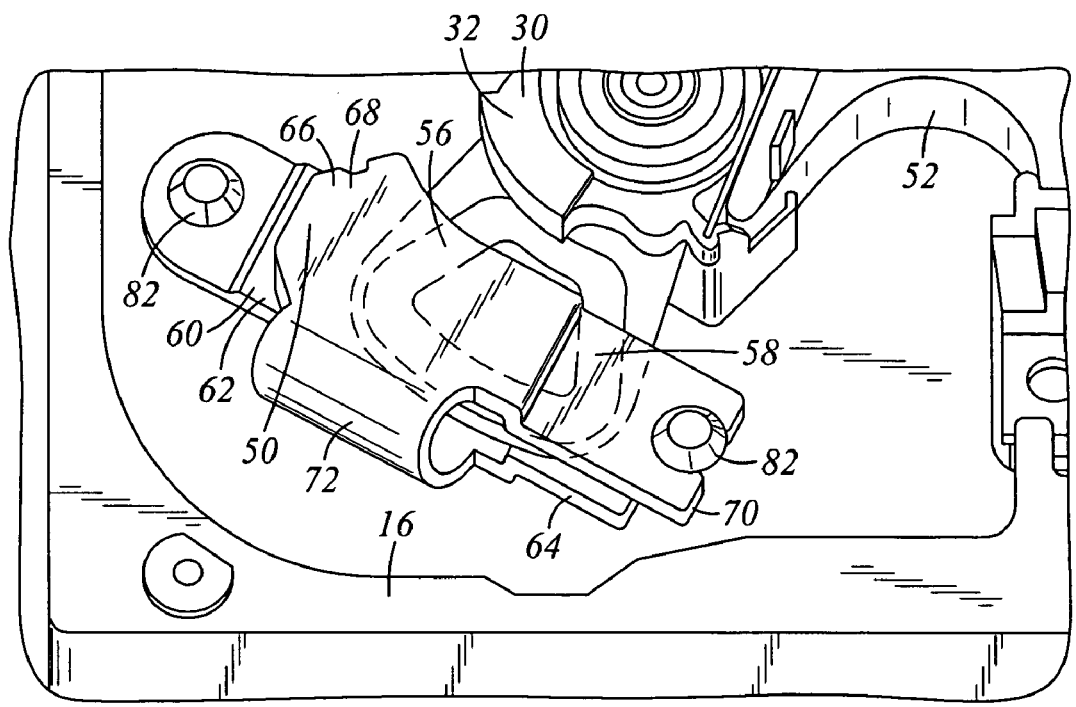
FIG. 6 is an enlarged perspective view of a portion the disk drive base, a portion of a rotary actuator (a portion of which is shown in phantom lining), and the magnetic element support of FIG. 1 as installed.

According to various embodiments, as seen in FIGS. 5 and 6, the first and second extension portions 64, 70 may be disposed generally angularly lateral to the first and second magnetic elements 46, 48 with respect to the axis of rotation 40. In this regard, at least some portion of both the first and second extension portions 64, 70 has a radial distance from the axis of rotation 40 as some portion of the coil 44.

As further seen in FIGS. 5 and 6, the transition section 72 may be disposed radially beyond the first and second magnetic elements 46, 48 with respect to the axis of rotation 40. In this regard, the transition section 72 may be radially further than the coil 44 with regard to the axis of rotation 40. The coil 44 is disposed between the transition section 72 and the axis of rotation 40. Such configuration facilitates the two magnetic flux paths without adding structure to both lateral sides of the first and second plate sections 60, 66. This may be desirable where space specifications limit the lateral geometry of the magnetic element support 50. Further, by positioning the transition section 72 radially further than the coil 44 rather than radially lateral to the coil 44, this allows for ease of assembly of the rotary actuator 30 in relation to the magnetic element support 50 and the disk drive base 16. This is due to the open lateral side.

It is contemplated that any number of magnetic element configurations may be chosen from those that are well known to one of ordinary skill in the art. Thus, it is understood that the present invention may be practiced with configurations having a single magnetic element or additional magnetic elements and with various magnetic polarity arrangements. Further, the present invention may be practiced with any number of coil arrangements which may include multiple coils and/or coil segments and various coil geometries. Likewise, the coil support arrangement may be chosen from any of those which are well known to one of ordinary skill in the art.

The first plate section 60, the second plate section 66, and the transition section 72 may be formed of a unitary piece of material. As such, the magnetic element support 50 may be integrally formed. In the particular embodiment shown, the transition section 72 may be integrally formed with the first and second support portions 62, 68. Further, the transition section 72 may be curved such as shown. In this embodiment, the transition section 72 is a smooth C-shape. Other shapes such as a more rectangular cross section may be utilized.

The magnetic element support 50 may be formed of a metal, such as steel. In addition, the magnetic element support 50 may be metal plated. As such, the magnetic element support 50 may be nickel plated with the nickel plating being used to protect the underlying steel from corroding.

Figure 7:
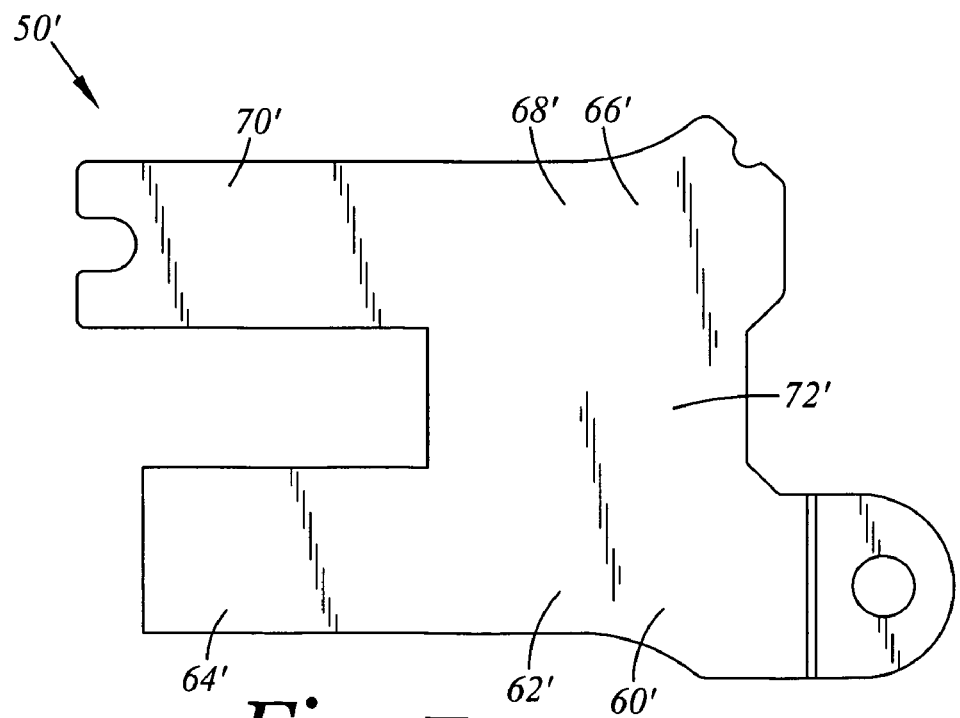
FIG. 7 is a top plan view of the magnetic element support as shown in a un-bended configuration prior to final manufacture.

Referring now to FIG. 7 there is depicted a plan view of an un-bended magnetic element support 50' prior to being formed into the magnetic element support 50. In this regard, the un-bended magnetic element support 50' may be formed from a sheet of material, such as a sheet of stainless steel. A stamping process may be used to form the un-bended magnetic element support 50' which is then subsequently bent. The un-bended magnetic element support 50' includes a first plate section 60' (including a first support section 62' and a first extension portion 64'), a second plate section 66' (including a second support section 68' and a second extension portion 70'), a transition section 72'. The first plate section 60' and the second plate section 66', and the transition section 72' are bent to form the first support section 62, the first extension portion 64, the second support section 68, the second extension portion 70, and the transition section 72.

I claim:

1. A disk drive comprising:
a disk drive base;
a disk rotatably coupled to the disk drive base;
a rotary actuator coupled to the disk drive base adjacent the disk, the rotary actuator being configured to pivot about an axis of rotation, the rotary actuator including a coil, the coil including a first leg and a second leg;
first and second magnetic elements; and
a magnetic element support coupled to the disk drive base, the magnetic element support including:
a first plate section including a first support portion and a first extension portion, the first magnetic element being attached to the first support portion;
a second plate section including a second support portion and a second extension portion, the second magnetic element being attached to the second support portion, the first leg disposed between the first and second magnetic elements and not between the first and second extension portions with the second leg disposed between the first and second extension portions and not between the first and second magnetic elements; and a transition section formed between the first and second plate sections.

2. The disk drive of claim 1 wherein the first plate section, the second plate section, and the transition section are formed of a unitary piece of material.

3. The disk drive of claim 1 wherein the transition section is integrally formed with the first and second support portions.

4. The disk drive of claim 1 wherein the rotary actuator further includes a coil support, the coil is supported by the coil support.

5. The disk drive of claim 1 wherein the first leg generally radially extends with respect to the axis of rotation and a second leg generally radially extends with respect to the axis of rotation.

6. The disk drive of claim 1 wherein the first magnetic element includes two poles, the second magnetic element includes two poles, the first and second magnetic elements have poles with opposite polarities facing each other.

7. The disk drive of claim 1 wherein the magnetic element support is formed of steel.

8. The disk drive of claim 7 wherein the magnetic element support is metal plated.

9. The disk drive of claim 1 wherein the transition section is curved.

10. The disk drive of claim 9 wherein the transition section is C-shaped.

11. A disk drive comprising:
a disk drive base;
a disk rotatably coupled to the disk drive base;
a rotary actuator coupled to the disk drive base adjacent the disk, the rotary actuator being configured to pivot about an axis of rotation, the rotary actuator including a coil, the coil including a first leg and a second leg;
first and second magnetic elements; and
a magnetic element support coupled to the disk drive base, the magnetic element support including:
a first plate section including a first support portion and a first extension portion, the first magnetic element being attached to the first support portion;
a second plate section including a second support portion and a second extension portion, the second magnetic element being attached to the second support portion, the second extension portion being cooperatively formed with the first extension portion to receive the first leg between the first and second magnetic elements with the second leg between the first and second extension portions;
a transition section formed between the first and second plate sections;
wherein a primary magnetic flux path extends through the second magnetic element, the second support portion, the transition section, the first support portion, the first magnetic element, and the first leg;
wherein a secondary magnetic flux path extends through the second magnetic element, the second support portion, the second extension portion, the second leg, the first extension portion, the first support portion, the first magnetic element, and the first leg; and
wherein the transition section is disposed radially beyond the first and second magnetic elements with respect to the axis of rotation.

12. A disk drive comprising:
a disk drive base;
a disk rotatably coupled to the disk drive base;
a rotary actuator coupled to the disk drive base adjacent the disk, the rotary actuator being configured to pivot about an axis of rotation, the rotary actuator including a coil, the coil including a first leg and a second leg;
first and second magnetic elements; and
a magnetic element support coupled to the disk drive base, the magnetic element support including:
a first plate section including a first support portion and a first extension portion, the first magnetic element being attached to the first support portion;
a second plate section including a second support portion and a second extension portion, the second magnetic element being attached to the second support portion, the first leg disposed between the first and second magnetic elements and not between the first and second extension portions with the second leg disposed between the first and second extension portions and not between the first and second magnetic elements; and
a transition section formed between the first and second plate sections,
wherein the first and second extension portions are disposed generally angularly lateral to the first and second magnetic elements with respect to the axis of rotation.

* * * * *